United States Patent [19]

Oyama et al.

[11] Patent Number: 4,465,948

[45] Date of Patent: Aug. 14, 1984

[54] DEVICE FOR COOLING A REVERSIBLE MOTOR

[75] Inventors: Shigeaki Oyama, Hachioji; Kosei Nakamura; Yoshiyuki Hayashi, both of Hino; Shigeru Koyoshida, Omuta, all of Japan

[73] Assignee: Fujitsu Fanuc Limited, Tokyo, Japan

[21] Appl. No.: 395,035

[22] PCT Filed: Oct. 14, 1981

[86] PCT No.: PCT/JP81/00283

§ 371 Date: Jun. 14, 1982

§ 102(e) Date: Jun. 14, 1982

[87] PCT Pub. No.: WO82/01447

PCT Pub. Date: Apr. 29, 1982

[51] Int. Cl.³ .................................. H02K 9/06
[52] U.S. Cl. ........................ 310/62; 310/58; 310/59; 310/63
[58] Field of Search .............. 310/52, 53, 58, 59, 310/60 R, 62, 63, 64, 65, 114, 112, 89

[56] References Cited

U.S. PATENT DOCUMENTS

| 1,751,424 | 3/1930 | Rosenthal | 310/58 |
| 3,502,916 | 3/1970 | Stavrache | 310/62 |
| 3,719,843 | 3/1973 | Dochterman | 310/62 |
| 4,132,912 | 1/1979 | Wright | 310/62 |

FOREIGN PATENT DOCUMENTS

| 14012 | 6/1966 | Japan | 310/58 |
| 44962 | 12/1973 | Japan | 310/58 |
| 51-21107 | 2/1976 | Japan | 310/62 |
| 79609 | 6/1976 | Japan | 310/58 |
| 70303 | 6/1977 | Japan | 310/58 |

Primary Examiner—R. Skudy
Attorney, Agent, or Firm—Armstrong, Nikaido, Marmelstein & Kubovcik

[57] ABSTRACT

A device for cooling a reversible motor comprising: a plurality of blade-type cooling fins (17) attached to the protrusion (13b) of a rotary shaft (13) which protrusion is protruded into a cooling chamber (5) formed on the outside of a motor case (10); an exhaust blower (25) provided on the outer side of the cooling chamber (5) in the axial direction to expel the cooling air, and; a fixed rectifying vane (29), consisting of a plurality of radially arrayed guide vanes (29a), provided in the exhaust space (28) between the blade-type cooling fins (17) and the exhaust blower. In the cooling device, the cooling air stream, moving in a spiral manner, passes through the blade-type cooling fins (17), is rectified in the axial direction via the fixed rectifying vane (29) and is expelled by the exhaust blower (25), when the motor runs in both the forward and the reverse directions.

11 Claims, 4 Drawing Figures

DEVICE FOR COOLING A REVERSIBLE MOTOR

DESCRIPTION

1. Technical Field

The present invention relates to a device for cooling motors, and more particularly to the improvement in the construction of a device for cooling motors which run in both forward and reverse directions, so that the cooling air can be expelled more efficiently.

2. Background Art

In order to radiate the heat that is generated by iron losses, copper losses and the like when the motor is operated continuously, a known cooling device consists of permitting the rotary shaft of a motor to protrude into a cooling chamber that is formed on the outside of the motor case, attaching blade-type cooling fins to the protruded portion in a radial manner to form a vane wheel, forming an exhaust hole in the central portion of the rear wall of the cooling chamber (hereinafter, the side of the motor case is referred to as the front direction relative to the cooling chamber, and the opposite side is referred to as the rear direction), and permitting the cooling air taken in from the front direction of the cooling chamber to pass through the blade-type cooling fins and be expelled rearwards in the axial direction through the exhaust hole, so that the generated heat is radiated. In order to enhance the cooling effect, furthermore, it has also been attempted to mount the exhaust blower on the rear wall of the cooling chamber by some means so that the blower faces the exhaust hole, and so that the blower may cooperate, together with the blade-type fins, to intensify the flow of the cooling air.

The above-mentioned cooling devices, however, have been constructed based on an idea that the motor, i.e., the blade-type cooling fins, and the exhaust blower rotate in the same direction.

In recent years, motors that serve as actuators have been finding a diversified range of applications accompanying the development in industrial machinery. Among such applications, a motor which is capable of running in either the forward direction or the reverse direction without reversible means has been frequently employed.

If the conventional cooling device is adapted to the reversible motor, the stream of cooling air produced by the blade-type fins reversely acts upon the stream of air that is produced by the vanes of the exhaust blower when the motor is reversely rotated, i.e., when the blade-type cooling fins are rotated in the direction opposite to the running direction of the exhaust blower. Therefore, rotation of the exhaust blower is hindered or is often stopped, making it difficult to smoothly expel the cooling air. This phenomenon is described below in further detail. The air stream created by the blade-type cooling fins flows in a spiral manner accompanying the rotation of the cooling fins, i.e., flows in a whirling manner, and is expelled in the axial direction. Therefore, when the cooling fins rotate in the same direction as the exhaust blower, the spiral flow of the air stream so works as to impart a rotational force to the vanes of the exhaust blower. On the other hand, when the blade-type cooling fins are rotated in the reverse direction, the direction of spiral flow of the cooling air stream is reversed, and reversely acts upon the vanes of the exhaust blower, so that the rotation of the exhaust blower is hindered giving rise to the occurrence of trouble. To solve this problem, therefore, it is most desirable to rectify the spiral flow, or whirling flow, of the air stream created by the blade-type cooling fins into a linear flow so that it is expelled by the exhaust blower.

DISCLOSURE OF THE INVENTION

The object of the present invention is to provide a device for cooling a reversible motor, which device has an improved construction to rectify the flow of the cooling air so that a good cooling effect can be obtained when the motor is running either in the forward direction or in the reverse direction, and which can be simply and cheaply constructed.

According to the present invention, there is provided a device for cooling a reversible motor, characterized in that a rotary shaft is protruded into a cooling chamber that is formed on the outside of a motor case and blade-type cooling fins are attached to said protruded portion, an exhaust blower is provided on the outer side of said cooling chamber in the axial direction to expel the cooling air, and a fixed rectifying vane, consisting of a plurality of radially arrayed guide vanes, is provided in the space between said blade-type cooling fins and said blower, maintaining a small clearance relative to the circumference at the end of said rotary shaft, such that the cooling air, which has passed through said blade-type cooling fins, is rectified in the axial direction via said fixed rectifying vane and is expelled by said blower toward the external side in the axial direction.

BRIEF EXPLANATION OF DRAWINGS

FIG. 1 is a longitudinal sectional view along the line B—B of FIG. 2, and FIG. 2 is a transverse sectional view along the line A—A of FIG. 1;

FIG. 3 is a partly cut-away longitudinal sectional view along the line D—D of FIG. 4, and FIG. 4 is a transverse sectional view along the line C—C of FIG. 3.

BEST MODE FOR CARRYING OUT THE INVENTION

The invention will be described below in further detail with reference to the embodiments shown in the accompanying drawings.

Figure 1:
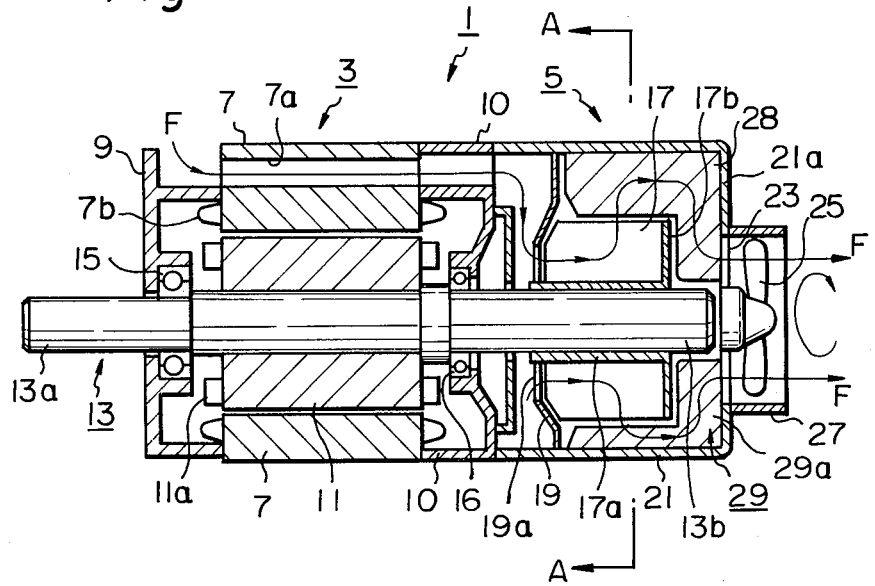
FIGS. 1 and 2 illustrate an AC motor equipped with a cooling device according to an embodiment of the present invention, where
Figure 2:
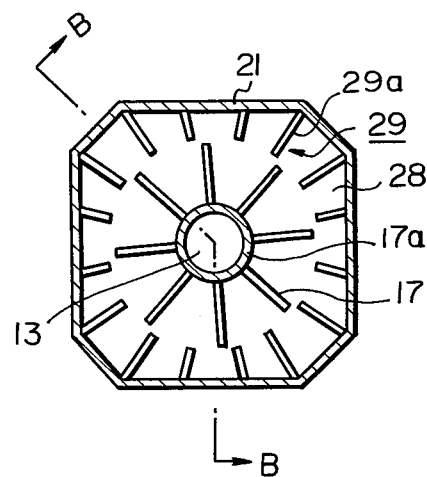

FIGS. 1 and 2 illustrate an AC motor equipped with a cooling device according to an embodiment of the present invention, where FIG. 1 is a longitudinal sectional view along the line B—B of FIG. 2, and FIG. 2 is a transverse sectional view along the line A—A of FIG. 1. In the drawings, reference numeral 1 denotes a motor which is equipped with a cooling device, and which consists of a rotary drive unit 3 and a cooling chamber 5. A stator 7 has a continuous and unitary structure along the outer periphery in the radial direction, serves as a yoke, has a winding 7b, surrounds a rotor 11 maintaining a small air gap, and supports motor cases 9, 10 by suitable fixing means at both ends thereof in the axial direction. The stator 7 further has a plurality of elongated holes 7a that penetrate therethrough in the axial direction. The elongated holes 7a are communicated with the cooling chamber 5, work to take in the cooling air from the outside of the motor, and constitute a cooling device for the stator 7. The rotor 11, in which an end ring 11a is inlaid, is mounted on a rotary shaft 13 and is supported together with the rotary shaft 13 by bearings 15, 16 of the motor cases 9, 10 to rotate in either direction. The front end of the rotary shaft 13, that serves as an output shaft 13a, protrudes forwards beyond the motor case 9 so as to be coupled to various devices (not shown) that are to be driven, and the rear end thereof protrudes backwards beyond the motor case 10, i.e., protrudes into the cooling chamber 5. A plurality of blade-type cooling fins 17 are mounted on the rear protrusion 13b via a sleeve 17a to constitute a vane wheel. Further, a circular cooling air guide board 17b is attached to the rear ends of the blade-type cooling fins 17 to guide the cooling air in the direction of arrow F. A cooling air guide wall 19, with opening 19a to introduce the cooling air, is provided in front of the cooling fins 17 maintaining a small gap in the axial direction, and maintaining a suitable gap in the radial direction relative to the outer periphery of the rotary shaft 13, such that the cooling fins 17 in the radial direction, as indicated by arrow F. Here, the blade-type cooling fins 17, sleeve 17a and circular cooling air guide board 17b may be formed beforehand as a unitary structure, using a material having a good heat conductivity, such as aluminum plate. A fin cover 21, covering the outer peripheries in the radial direction and in the axial directions of the blade-type cooling fins 17, is mounted by suitable means on the motor case 10 to form an outer wall of the cooling chamber 5. An exhaust hole 23, having a diameter nearly the same as the diameter of the blade-type cooling fins 17, is formed in the outer wall of the fin cover 21 in the axial direction, i.e., formed in the end wall 21a of the cooling chamber 5, being opposed to the cooling fins 17. An exhaust blower 25 for expelling the cooling air is mounted by suitable fixing means on the fin cover 21 at a position opposed to the exhaust hole 23, i.e., at the back of the rear protrusion 13b of the rotary shaft 13, and a cylindrical guide cover 27 is mounted on the fin cover 21 to cover the circumference of the exhaust blower 25. The guide cover 27 works to guide the flow of cooling air expelled by the exhaust blower 25 toward the outside of the device in the axial direction.

The exhaust blower 25 may be a customarily employed one, and its electric circuit (not shown) for driving is constructed independently of the electric circuit (not shown) of the motor 1; i.e., the exhaust blower 25 rotates in a predetermined direction at all times, irrespective of the running direction of the motor 1. Even when the cooling fins 17 are running at low speeds or are at rest, the cooling air is taken in and is expelled by the exhaust blower to maintain a good cooling effect.

Moreover, a fixed rectifying vane 29, consisting of a plurality of guide vanes 29a, is mounted on the fin cover 21 in the space 28 between the blade-type cooling fins 17 and the exhaust blower 25, maintaining a small gap relative to the periphery in the radial direction of the rear protrusion 13b of the rotary shaft 13, the guide vanes 29a being arrayed in the radial direction of the cooling chamber 5. The guide vanes 29a of the fixed rectifying vane 29 are made of a thin plate, and are arrayed to be parallel with the axis of the rotary shaft 13, as shown in FIGS. 1 and 2. The distance among the guide vanes 29a is suitably determined depending upon the size of the motor, rate of blowing the cooling air, and capacity of the exhaust blower 25. By forming the fixed rectifying vane 29 as mentioned above, the transverse section of the space 28 is radially divided by the guide vanes 29a; the thus divided spaces guide the cooling air to flow in the axial direction, but not in the rotating direction. Therefore, the whirling stream of cooling air, created by the blade-type cooling fins 17 which run either in the forward direction or in the reverse direction, is exactly rectified in the axial direction by the fixed rectifying vane 29, and is guided to the exhaust blower 25. Since the cooling air is thus rectified in the axial direction, rotation of the blower 25 is not interrupted irrespective of whether the rotary shaft 13 turns in the forward direction or in the reverse direction, and the cooling air is expelled efficiently.

Figure 3:
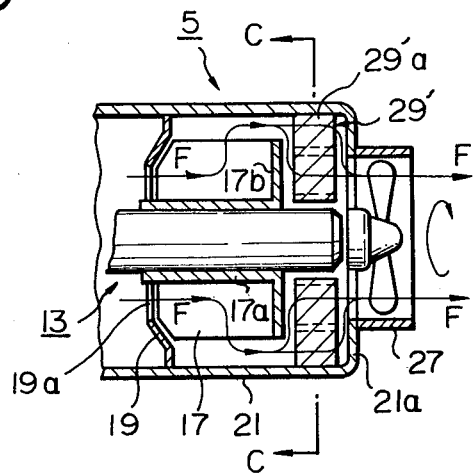
FIGS. 3 and 4 illustrate another embodiment according to the present invention, where
Figure 4:
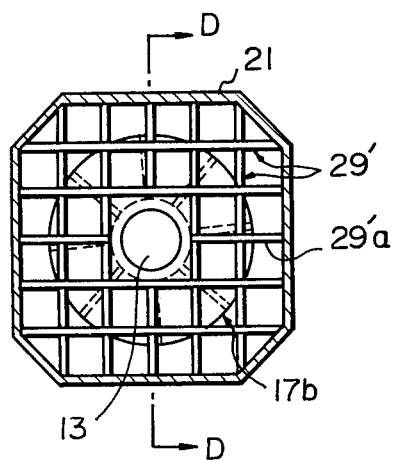

FIGS. 3 and 4 illustrate a motor equipped with a cooling device according to another embodiment of the present invention, where FIG. 3 is a partly cut-away longitudinal sectional view along the line D—D of FIG. 4, and FIG. 4 is a transverse sectional view along the line C—C of FIG. 3. In these drawings, the same reference numerals as those of FIGS. 1 and 2 denote the same members as those of FIGS. 1 and 2. In this embodiment, the fixed rectifying vane 29' consists of guide vanes 29'a that are arrayed like a grid, and the space 28 is divided into square cylinders in the axial direction to produce the same effects as the above-mentioned embodiment.

Being constructed as mentioned above, the cooling device of the present invention efficiently guides the cooling air in the direction indicated by arrow F irrespective of whether the motor runs in the forward direction or in the reverse direction. Furthermore, the cooling device of the present invention can be simply and cheaply constructed.

We claim:

1. A device for cooling a reversible motor, said motor including a rotary shaft, a rotor mounted on said rotary shaft, a stator surrounding said rotor, and a motor case supporting said stator and said rotary shaft and having a front end and a rear end, said stator having a plurality of elongated holes extending axially therethrough, said motor case including a cooling chamber coaxially arranged on said rear end thereof, said rotary shaft having a portion extending into said cooling chamber beyond said rear end; said device for cooling comprising:
   blade-type cooling fins attached to said portion of said rotary shaft extending into said cooling chamber,
   an exhaust blower provided outside of said cooling chamber adjacent an axially positioned exhaust hole for expelling cooling air in an axial direction, and
   fixed rectifying vane means mounted in a space in said cooling chamber between said blade-type cooling fins and said exhaust hole maintaining a small clearance relative to a circumference at an end of said rotary shaft, such that the cooling air which has passed through said blade-like cooling fins is rectified in the axial direction via said fixed rectifying vane means and is expelled by said exhaust blower from said cooling chamber in an axial direction.

2. A device for cooling a reversible motor as set forth in claim 1, wherein said fixed rectifying vane means is a rectifying grid which consists of a plurality of guide vanes that are arrayed in the form of a grid.

3. A device for cooling a reversible motor as set forth in claim 2, wherein a cooling air guide wall surrounds said rotary shaft at a position in front of said blade-type cooling fins, maintaining a small clearance in the axial direction relative to the front portion of said fins and maintaining a suitable clearance in the radial direction relative to the circumference of the rotary shaft.

4. A device for cooling a reversible motor as set forth in claim 2, wherein a circular cooling air guide board is fastened to the rear ends of said blade-type cooling fins.

5. A device for cooling a reversible motor as set forth in claim 3, wherein a circular cooling air guide board is fastened to the rear ends of said blade-type cooling fins.

6. A device for cooling a reversible motor as set forth in claim 1, wherein a circular cooling air guide board is fastened to the rear ends of said blade-type cooling fins.

7. A device for cooling a reversible motor as set forth in claim 1, wherein said fixed rectifying vane means consists of a plurality of radially arrayed guide vanes.

8. A device for cooling a reversible motor as set forth in claim 7, wherein a cooling air guide wall surrounds said rotary shaft at a position in front of said blade-type cooling fins, maintaining a small clearance in the axial direction relative to the front portion of said fins and maintaining a suitable clearance in the radial direction relative to the circumference of the rotary shaft.

9. A device for cooling a reversible motor as set forth in claim 8, wherein a circular cooling air guide board is fastened to the rear ends of said blade-type cooling fins.

10. A device for cooling a reversible motor as set forth in claim 1, wherein a cooling air guide wall surrounds said rotary shaft at a position in front of said blade-type cooling fins, maintaining a small clearance in the axial direction relative to the front portion of said fins and maintaining a suitable clearance in the radial direction relative to the circumference of the rotary shaft.

11. A device for cooling a reversible motor as set forth in claim 10, wherein a circular cooling air guide board is fastened to the rear ends of said blade-type cooling fins.

* * * * *